United States Patent
Meitinger

(10) Patent No.: US 9,239,084 B2
(45) Date of Patent: Jan. 19, 2016

(54) SAFETY COUPLING FOR A MOTOR VEHICLE

(75) Inventor: Karl-Heinz Meitinger, München (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/007,246

(22) PCT Filed: Sep. 8, 2011

(86) PCT No.: PCT/EP2011/004522
§ 371 (c)(1),
(2), (4) Date: Sep. 24, 2013

(87) PCT Pub. No.: WO2012/130265
PCT Pub. Date: Oct. 4, 2012

(65) Prior Publication Data
US 2014/0024467 A1    Jan. 23, 2014

(30) Foreign Application Priority Data
Mar. 25, 2011 (DE) .......... 10 2011 015 024

(51) Int. Cl.
*F16D 7/06* (2006.01)
*F16D 3/74* (2006.01)

(52) U.S. Cl.
CPC ... *F16D 3/74* (2013.01); *F16D 7/06* (2013.01)

(58) Field of Classification Search
CPC .................................. F16D 3/74; F16D 7/06
USPC .................. 464/35, 36, 88, 93–95; 192/70.17
See application file for complete search history.

(56) References Cited

U.S. PATENT DOCUMENTS

| 2,174,168 | A | * | 9/1939 | Rattray |
| 3,567,010 | A | * | 3/1971 | Vom Stein ............... 464/36 X |
| 4,368,050 | A | | 1/1983 | Peterson |
| 4,615,426 | A | * | 10/1986 | Lech, Jr. ............... 192/70.17 X |
| 4,971,267 | A | * | 11/1990 | Fulton et al. |
| 5,683,299 | A | | 11/1997 | Kishibuchi et al. |
| 2008/0190725 | A1 | | 8/2008 | Joos et al. |

FOREIGN PATENT DOCUMENTS

| CH | 235094 | 3/1945 |
| CN | 2260915 Y | 8/1997 |
| CN | 2763627 Y | 3/2006 |
| CN | 1982744 | 6/2007 |
| CN | 101160475 A | 4/2008 |

(Continued)

OTHER PUBLICATIONS

International Search Report issued by the European Patent Office in International Application PCT/EP2011/004522 on Oct. 21, 2011.

(Continued)

*Primary Examiner* — Gregory Binda
(74) *Attorney, Agent, or Firm* — Henry M. Feiereisen LLC

(57) ABSTRACT

In a safety coupling for a motor vehicle for transmitting a driving torque between a machine shaft of an electric machine and a wheel drive shaft driving at least one wheel of a vehicle, torque is transmitted during disturbance free normal operation between the machine shaft and the wheel drive shaft via a releasable positive coupling. If a torque exceeding a limit value occurs, the releasable positive coupling is disengaged, and therefore an elastic coupling device at least briefly takes over the transmission of torque.

8 Claims, 2 Drawing Sheets

(56) References Cited

FOREIGN PATENT DOCUMENTS

| | | |
|---|---|---|
| DE | 1 953 462 | 7/1971 |
| DE | 31 35 132 | 4/1982 |
| DE | 102005017819 | 10/2006 |
| DE | 202007001430 | 5/2007 |
| DE | 202007008591 | 9/2007 |
| DE | 102009015207 | 9/2010 |
| EP | 0 702 167 | 3/1996 |
| GB | 874155 | 8/1961 |
| JP | 2009257404 A | 11/2009 |
| SE | SW 57604 * | 9/1924 ............ 464/35 |

OTHER PUBLICATIONS

Chinese Search Report issued Mar. 30, 2015 with respect to counterpart Chinese patent application 201180069525.5.

Translation of Chinese Search Report issued Mar. 30, 2015 with respect to counterpart Chinese patent application 201180069525.5.

* cited by examiner

SAFETY COUPLING FOR A MOTOR VEHICLE

CROSS-REFERENCES TO RELATED APPLICATIONS

This application is the U.S. National Stage of International Application No. PCT/EP2011/004522, filed Sep. 8, 2011, which designated the United States and has been published as International Publication No. WO 2012/130265 and which claims the priority of German Patent Application, Serial No. 10 2011 015 024.2, filed Mar. 25, 2011, pursuant to 35 U.S.C. 119(a)-(d).

BACKGROUND OF THE INVENTION

The invention relates to a safety coupling for a motor vehicle.

In electric vehicles or hybrid vehicles that use an electric machine as driving engine the electric machine is often inseparably connected with the drive wheels, i.e, there is no coupling between the electric machine and the driving wheels but for example only a positive force transmission element such as a cardan shaft or a transmission. When an error occurs in the electric machine or in the power electronics in such a rigid drive connection or when the power electronics is switched to an active short circuit for generating a safe vehicle state, very high torque peaks can occur for a short time which significantly exceed the nominal torque of the motor and can vibrate with high frequency. Such a torque peak can have triple the value of the nominal motor torque, which may render the motor vehicle instable with regard to driving dynamics. The tires of the drive wheels, which are rigidly coupled with the electric machine via the drive train, may thereby lose their grip on the street.

In principle, it is possible to integrate elastic intermediate elements into the drive train in order to decrease the torque peak in case of a malfunction. This elasticity in the drive train however has adverse effects during normal operation, because the positive characteristic of the electric machine, namely a fast torque buildup, can no longer be optimally used. In addition, the elastic intermediate elements also render the drive train more prone to interfering vibration during normal operation.

SUMMARY OF THE INVENTION

The invention is based on the object to set forth a safety coupling for a motor vehicle, which on one hand during normal operation has a best possible torque transmission between the electric machine and the drive wheels, and on the other hand positively influences the driving stability when an excessive torque peak occurs.

The object is solved by a safety coupling for a motor vehicle, including a releasable positive coupling transmitting a torque during a disturbance-free normal operation between a machine shaft of an electric machine and a wheel drive shaft which drives at least one wheel of the motor vehicle, wherein the releasable positive coupling is constructed to disengage in response to a torque exceeding a threshold value; and an elastic coupling device constructed to at least briefly take over the torque transmission between the machine shaft and the wheel drive shaft when the releasable positive coupling disengages. Preferred refinements of the invention are set forth in the subclaims.

According to the characterizing portion of the independent claim, the safety transmission is a releasable positive connection between the machine shaft of the electric machine and the wheel drive shaft of one or multiple drive wheels. Thus during normal operation there is an optimal torque transmission between the electric machine and the drive wheels. As soon as an excessive torque occurs however, a positive coupling of the safety transmission disengages, resulting in the release of the positive coupling between the machine shaft and the wheel drive shaft. In this case an elastic coupling device then takes over the torque transmission between the machine shaft and the wheel drive shaft, wherein the torque peak is elastically dampened to prevent the loss of grip on the drive wheels or on the tires of the drive wheels. A torque vibration resulting from a malfunction, for example a short circuit on the electric machine, is thus only transmitted to the wheel drive shaft and with this to the driving wheel in a dampened manner.

The safety coupling also has the advantage that a torque transmission in both directions i.e., in the motor mode as well as in the generator mode can occur with the safety function.

The elastic coupling device, which is active in case of malfunction when a corresponding excessive torque peak occurs, can consist of at least one elastic rubber element via which the machine shaft is elastically rotatably coupled. Such an elastic connection can be a rubber ring, which is arranged between two flanges, which are fastened at one side on the machine shaft and at the other side on the wheel drive shaft, with steel pins which project from the flanges alternately engaging in the rubber ring. The elastic coupling device can also be configured as elastic bolt coupling which has multiple connection bolts which are arranged between two flanges. In principle other elastic coupling elements can be used so long as they enable an elastic coupling of two shafts. In any case it is important however that the elastic coupling device is not active during normal operation but rather a positive coupling between machine shaft and wheel drive shaft exists which only disengages when a torque threshold value is exceeded so that the elastic coupling device then takes over a short-time dampened torque transmission between the machine shaft and the wheel drive shaft. When the torque returns to the normal range the positive coupling can take over the torque transmission again.

It is particularly advantageous that the safety coupling according to the invention does not require control elements or sensors or other active monitoring devices but rather the safety coupling is a passive component, which involves passive switching between two operating states—rigid and elastic coupling, i.e., without requiring electric monitoring devices.

The releasable positive coupling can be realized very easily by means of resilient latching elements for example latching balls which are arranged in the region of the machine shaft and/or drive wheel shaft and engage in corresponding bearing seats of the respective opposite shaft and can be pushed out of the bearing seats against the force of a pressure spring. The shape of the bearing seats is adjusted to the shape and size of the latching balls. In addition the depth of the bearing seats is chosen so that the latching balls can be pushed out of the bearing seats against the spring force at a corresponding high torque.

The releasable positive coupling with resiliently arranged latching elements can be configured so that the latching balls are either pushed back radially or coaxially against a spring force relative to the orientation of the associated shaft. Via the strength of the used pressure springs which push the latching balls into the associated bearing seats, the torque threshold value can be defined at which the positive coupling disengages. Also the size of the latching balls, their number, their axial distance and the depth of the bearing seats can be selected so that the positive coupling disengages, when a predefined torque threshold value is exceeded.

BRIEF DESCRIPTION OF THE DRAWING

In the following, two exemplary embodiments of the invention are explained in the drawing figures.

It is shown in:

The safety coupling shown in FIG. 1 couples the machine shaft 1 with a wheel drive shaft 2 and is a component that is essentially rotationally symmetric to the shafts 1, 2. FIG. 1 only shows the upper region of the safety coupling.

DETAILED DESCRIPTION OF PREFERRED EMBODIMENTS

Figure 1:
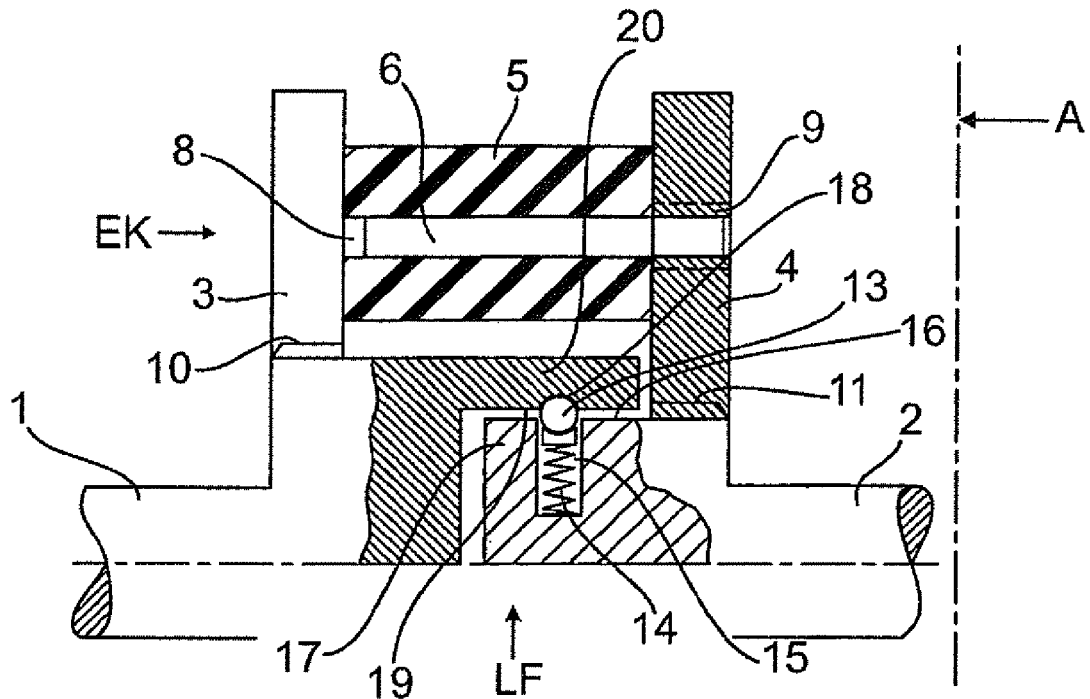
FIG. 1 a safety coupling with radially resilient latching balls, partially sectioned FIG. 2 the upper half of the front side view according to the direction of the arrow A of FIG. 1 and FIG. 3 an embodiment of a safety coupling with coaxially, resiliently arranged latching balls.

The safety coupling is formed by a first flange which surrounds the machine shaft 1 and a second flange 4 which overlaps the wheel drive shaft 2 between which shafts an elastic coupling element in the form of a rubber ring 5 extends. From the two flanges 3, 4 steel pins 6, 7 (see also FIG. 2) protrude alternately in even rotational angular distances into bores 8 of the rubber ring 5. The steel pin 6 is screwed on the flange 4 into a threading 9 while the steel pins 7 which are not visible in FIG. 1 correspondingly protrude from flange 3 and engage in the rubber ring 5.

The flanges 3, 4 with the rubber ring 5 and the steel pins 6, 7 form an elastic coupling device, which acts between the machine shaft 1 and the wheel drive shaft 2. The flange 3 or the flange 4 is connected in fixed rotative connection with the machine shaft 1 or the wheel drive shaft 2 by a gearing 10 or 11. In addition the flanges 3, 4 are here secured against an axial displacement on the shafts 1, 2 by not shown securing elements.

For torque transmission, the safety coupling of FIG. 1. has not only an elastic coupling device EK but also a releasable positive coupling LF. The releasable positive coupling LF has multiple latching elements 13 here for example latching balls, which are arranged in even rotational angular distances and can be pushed against the force of a pressure spring 14 into a bore 15. The latching balls 13 are distributed along the circumferential surface 16 of a shoulder 17 which is molded onto the wheel drive shaft 2, and engage in corresponding bearing seats 18 which are located on the inner surface 19 of a pipe socket 20 which is molded onto the machine shaft 1.

During normal operation, a positive connection is established via the latching balls 16 between the machine shaft 1 of an electric machine and the wheel drive shaft 2, which is for example rigidly coupled with a drive wheel of a motor vehicle. During the normal operation with positive connection between machine shaft 1 and wheel drive shaft 2, the elastic coupling EK is inactive. However, as soon as a malfunction with the excessive torque peak occurs at the machine shaft 1 this causes disengagement of the releasable positive coupling LF, in that the latching balls 13 are pushed out of the respective associated bearing seat 18 against the spring force 14. This is caused by a relative rotational movement between the machine shaft 1 and the wheel drive shaft 2.

As soon as the releasable positive connection LF disengages i.e., the positive connection is released, the elastic coupling EK takes over the torque transmission via the elastic rubber ring 5.

The occurrence of an impulsive malfunction causes a short-time disengagement of the releasable positive coupling LF, wherein a return to the normal positive connection occurs automatically, supported by the restoring force of the elastic coupling EK.

Figure 2:
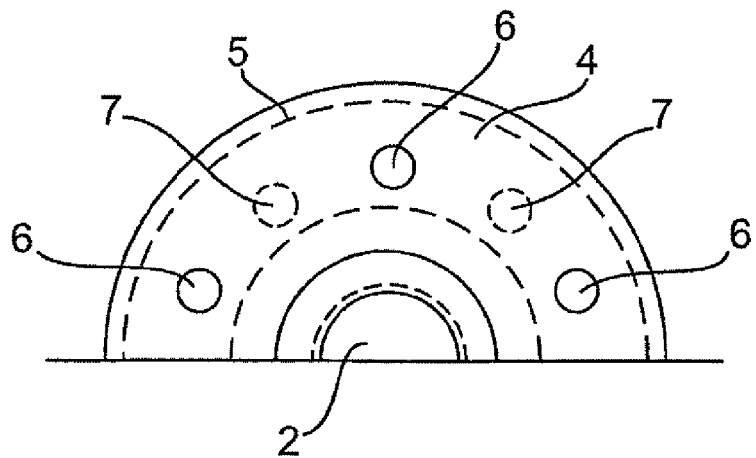

FIG. 2 shows the view of the safety coupling of FIG. 1 according to the direction of the arrow A in a slightly decreased scale, particularly illustrating the position of the steel pins 6, 7. The rubber ring 5 which is covered by the flange 4 is rotationally fixed with the wheel drive shaft 2 by a gearing 11 which has a gear rim which is formed on the wheel drive shaft 2 and is indicated with a broken line.

Figure 3:
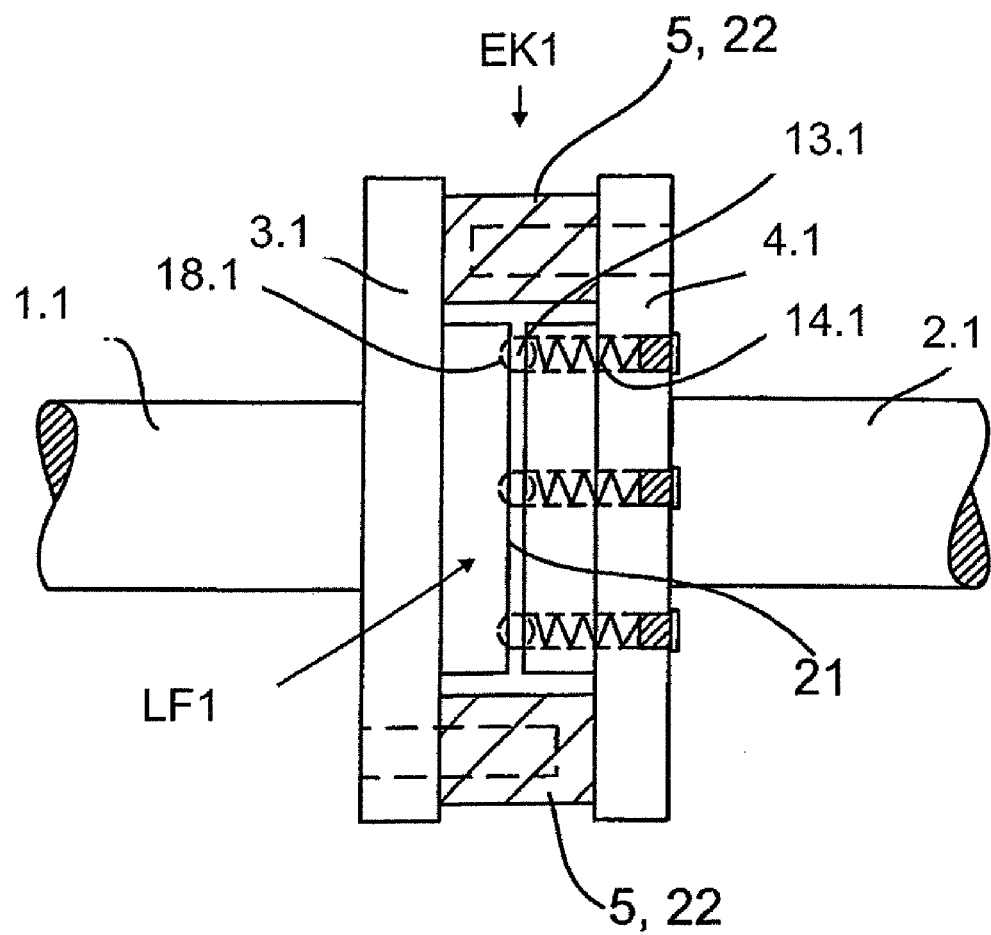

In the exemplary embodiment shown in FIG. 3 a releasable positive connection LF1 also acts between a first flange 1.1 and a second flange 4.1, in which the used latching balls 13.1 are axially movable against the spring force of pressure springs 14.1. The latching balls 13.1 are pushed by pressure springs 14.1 into bearing seats 18.1 which are indicated by broken lines and are located on a front side 21 of the flange 3.1.

The elastic coupling EK1 is also in this case formed by a rubber ring 5. Instead of such a rubber ring 5 multiple elastic connection bolts 22 can also be used. In FIG. 3 there is a risk that when the positive connection is released, the two flanges 3.1, 4.1 may become axially offset. In order to counteract such an axial offset, a not shown rigid centering can be provided between the flanges 3.1, 4.1 for example bearings or pins.

The invention claimed is:

1. A safety coupling for a motor vehicle, comprising:
   a releasable positive coupling transmitting a torque during a disturbance-free normal operation between a machine shaft of an electric machine and a wheel drive shaft which drives at least one wheel of the motor vehicle, said releasable positive coupling being constructed to disengage in response to a torque exceeding a threshold value;
   an elastic coupling device constructed to at least briefly take over the torque transmission between the machine shaft and the wheel drive shaft when the releasable positive coupling disengages, said elastic coupling device including at least one elastic coupling element coupling the machine shaft and the wheel drive shaft for elastic rotation relative to each other at respective coupling sites, wherein during the rotation of the machine shaft and the wheel drive shaft relative to each other a torque acts transverse to an extent of the coupling element between the coupling sites, wherein the elastic coupling device acts between a flange arranged on the machine shaft and a flange arranged on the wheel drive shaft; and
   steel pins alternately protruding from the flange arranged on the machine shaft and the flange arranged on the wheel drive shaft and engaging in bores of the coupling element.

2. The safety coupling of claim 1, wherein the releasable positive coupling comprises latching elements resiliently arranged on the machine shaft and/or the wheel drive shaft, wherein the latching elements arranged on one of the machine shaft and the wheel drive shaft releasably engage with a spring force in bearing seats provided on another one of the machine shaft and the wheel drive shaft.

3. The safety coupling of claim 2, wherein the latching elements are constructed as latching balls.

4. The safety coupling of claim 3, wherein the latching balls are constructed to move out of the bearing seats against the spring force in response the torque exceeding the threshold value thereby disengaging the releasable positive coupling.

5. The safety coupling of claim 2, wherein the latching elements protrude radially resiliently from one of the two shafts against the force of pressure springs and engage in corresponding bearing seats which are formed on the inner wall of a pipe socket.

6. The safety coupling of claim 2, wherein the latching elements protrude coaxially resiliently from the machine shaft and/or the wheel drive shaft against the force of pressure springs and engage in corresponding respective bearing seats of the from the machine shaft and/or the wheel drive shaft.

7. A safety coupling for a motor vehicle, comprising:
   a releasable positive coupling transmitting a torque during a disturbance-free normal operation between a machine shaft of an electric machine and a wheel drive shaft which drives at least one wheel of the motor vehicle, said releasable positive coupling being constructed to disengage in response to a torque exceeding a threshold value; and
   an elastic coupling device constructed to at least briefly take over the torque transmission between the machine shaft and the wheel drive shaft when the releasable positive coupling disengages, said elastic coupling device including at least one elastic coupling element coupling the machine shaft and the wheel drive shaft for elastic rotation relative to each other at respective coupling sites, wherein during the rotation of the machine shaft and the wheel drive shaft relative to each other a torque acts transverse to an extent of the coupling element between the coupling sites, wherein the elastic coupling element is constructed as a rubber ring.

8. A safety coupling for a motor vehicle, comprising:
   a releasable positive coupling transmitting a torque during a disturbance-free normal operation between a machine shaft of an electric machine and a wheel drive shaft which drives at least one wheel of the motor vehicle, said releasable positive coupling being constructed to disengage in response to a torque exceeding a threshold value; and
   an elastic coupling device constructed to at least briefly take over the torque transmission between the machine shaft and the wheel drive shaft when the releasable positive coupling disengages, said elastic coupling device including at least one elastic coupling element coupling the machine shaft and the wheel drive shaft for elastic rotation relative to each other at respective coupling sites, wherein during the rotation of the machine shaft and the wheel drive shaft relative to each other a torque acts transverse to an extent of the coupling element between the coupling sites, wherein the coupling device is constructed as an elastic bolt coupling comprising multiple elastic connection bolts which act between the machine shaft and the wheel drive shaft.

* * * * *